J. M. FIELDS.
SHADOW DIAL COMPASS.
APPLICATION FILED DEC. 18, 1917.

1,270,505.

Patented June 25, 1918.
2 SHEETS—SHEET 1.

WITNESS

F. C. Fliedner

INVENTOR.
John M. Fields
BY
Strong & Townsend
ATTORNEYS

UNITED STATES PATENT OFFICE.

JOHN M. FIELDS, OF SAN FRANCISCO, CALIFORNIA.

SHADOW-DIAL COMPASS.

1,270,505.   Specification of Letters Patent.   Patented June 25, 1918.

Application filed December 18, 1917. Serial No. 207,645.

*To all whom it may concern:*

Be it known that I, JOHN M. FIELDS, a citizen of the United States, residing at the city and county of San Francisco and State of California, have invented new and useful Improvements in Shadow-Dial Compass, of which the following is a specification.

This invention relates to a shadow dial or compass corrector.

One of the objects of the present invention is to provide a simple, easily operated compass corrector by which compass deviations due to various causes may be quickly determined. Another object of the invention is to provide an instrument of the character described by which the magnetic course and also the true course of a ship may be instantly determined. Another object of the invention is to arrange the graduations on the compass dial so that direct readings may be instantly obtained whether for deviation or otherwise, thereby eliminating the necessity of further calculations and often resultant errors when an observation is made. Further objects will hereinafter appear.

The invention consists of the parts and the combination and arrangement of parts as hereinafter more fully described and claimed, reference being had to the accompanying drawings, in which—

Figure 1:
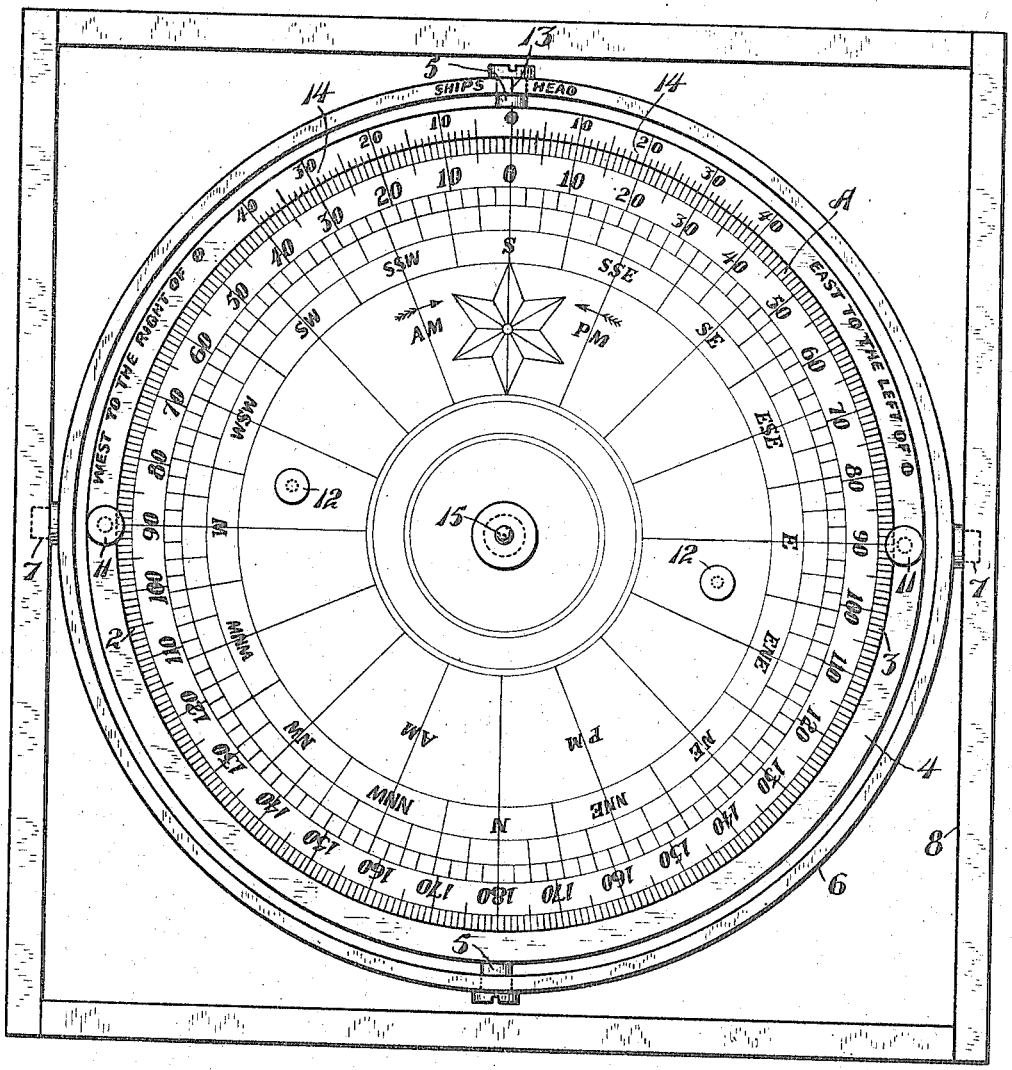
Figure 1 is a plan view of the instrument.
Figure 2:
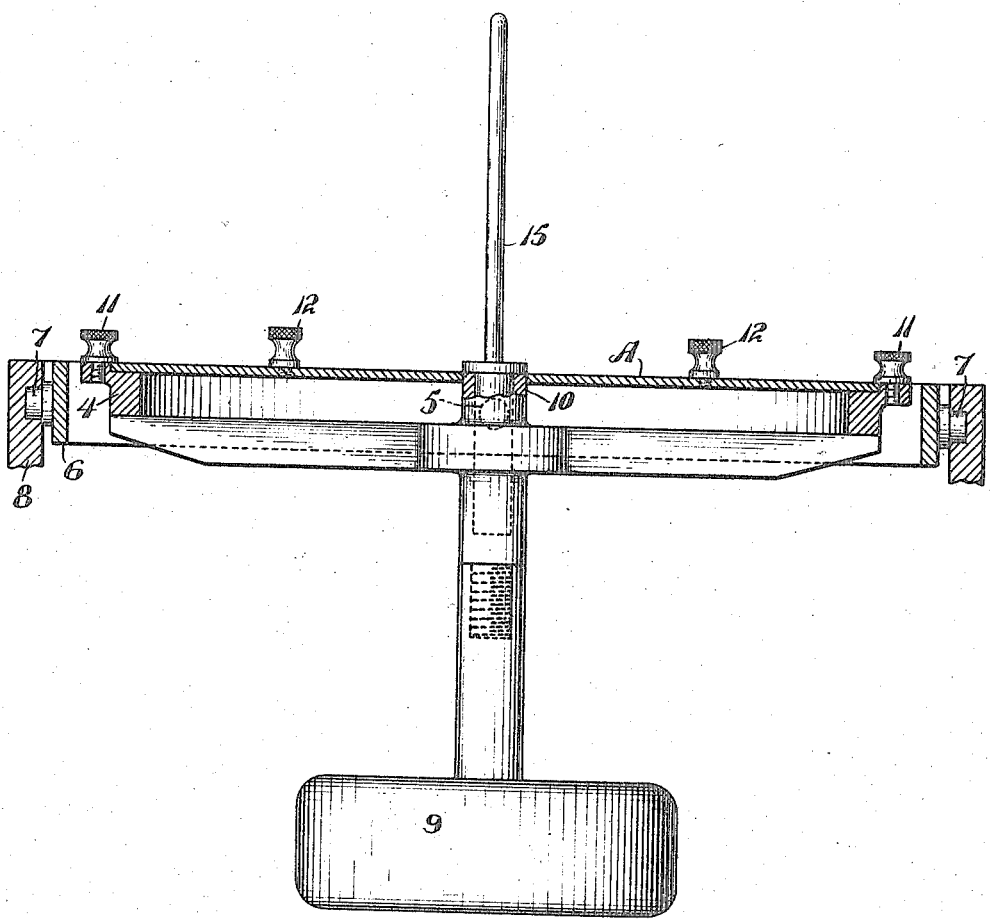
Fig. 2 is a central, vertical section through the same.

Referring to the drawings in detail, it will be seen that the instrument consists of a dumb card A, that is to say, a compass card without needles made of brass or any other suitable material which is entirely unmagnetic and not partaking in any way of the character of a compass except that its face shows the points. The periphery of the dial A is graduated from zero south to north 180° on each side, as shown at 2 and 3. The card is approximately seven inches in diameter and is adjustably mounted in an inner ring 4 which in turn is pivotally mounted, as at 5, in an outer gimbal ring 6 pivotally mounted, as at 7, in a box 8 provided for its reception. The inner ring 4 is provided with an adjustable balanced weight 9 suspended from the under side, thus enabling the card to preserve its horizontality whatever the motion of the ship may be. The card is adapted to be turned about an upright pivot 10 like a "teetotum" which is carried by the inner ring and it may be locked in any adjusted position when turned by means of a pair of clamping screws 11, suitable projections 12 being formed on the face of the card to provide means for conveniently turning the same about the pivot 10. The pivot referred to is hollow and internally threaded first to permit the weight 9 to be adjusted vertically and secondly to serve as a receiver and support for an ordinary sight vane, shadow pin 15 or any other suitable device employed. The outer ring is marked, as shown at 13, and serves the function of a lubber's point or ship's head while the edge of the inner ring is graduated from zero to 40° on each side to form a variation scale, as shown at 14.

The operation of the instrument is substantially as follows:

1st. Set south point of dial and sun's true bearing to variation of place and where the shadow falls will be the magnetic course the ship is making. The magnetic shadow left of compass course deviation is east and the magnetic shadow right of compass course deviation is west.

2nd. For a true course set south point of dial and sun's true bearing to zero or ship's head and where the shadow falls will be the true course.

3rd. Another method is to enter azimuth tables to the nearest degree of latitude declination and apparent time at ship to the nearest 4 min.—take out the sun's true bearing then local variation, apply it to S. T. B. east to the left and west to the right easterly variation must be subtracted in a. m. and added in p. m. sight in N. lat.

Opposite in south lat. and set to zero on outer ring and where the shadow falls is the magnetic course.

A compass and course corrector constructed as here shown has superior advantages over other instruments of a similar nature for the following reasons: It is so simple in construction and easy to operate that it is almost impossible to make any error if set according to directions, and also for the reason that the main dial A is graduated from zero to 180° on each side, thereby making it possible to take a direct reading without resorting to further calculations and often resultant errors.

While the device as here shown is provided with a shadow pin 12, I wish it understood that an arrow vane of the usual construction may be used for cloudy weather and also that the instrument may be employed as an "alidade" for azimuth amplitude or four-point bearing and for swinging ship for deviation by the sun, moon, stars or planets.

It will be noticed when using this instrument that there is only one card with compass points marked thereon and graduated from zero degrees to 180° commencing with the south point and ending with the north, but with the north point placed where the south point ought to be. This permits an instantaneous reading without resorting to further calculations, thereby rendering it possible to more rapidly determine deviations or to find a true or magnetic course, that is, when the present instrument is compared with instruments now employed.

The lubber line of the instrument is placed parallel to the fore and aft midship line of the ship. It is therefore only necessary to set the known sun's true bearing where it will be registered with the known variation of the position of the ship. Thus where the shadow falls will be the magnetic course the ship is making and the difference between this and the ship's compass will be the deviation of the compass.

Having thus described my invention, what I claim and desire to secure by Letters Patent is:

1. An instrument of the character described comprising an inner and an outer gimbal ring, said outer ring having a lubber line marked thereon and said inner ring having a variation scale formed thereon graduated from zero in alinement with the lubber line to 40° on each side, and a dumb card turnably mounted in the inner ring, said card being graduated from zero south to 180° north on each side.

2. An instrument of the character described comprising an inner and an outer gimbal ring, said outer ring having a lubber line marked thereon and said inner ring having a variation scale formed thereon graduated from zero in alinement with the lubber line to 40° on each side, a central post carried by the inner ring, a dumb card turnably mounted on said post, said card being graduated from zero south to 180° north on each side, and means for securing the card against turning movement about the post.

3. An instrument of the character described comprising an inner and an outer gimbal ring, said outer ring having a lubber line marked thereon and said inner ring having a variation scale formed thereon graduated from zero in alinement with the lubber line to 40° on each side, a central post carried by the inner ring, a dumb card turnably mounted on said post, said card being graduated from zero south to 180° north on each side, a shadow pin adapted to be supported by the central post and a pair of clamping screws carried by the inner ring adapted to secure the card against turning about the post.

In testimony whereof I have hereunto set my hand in the presence of two subscribing witnesses.

JOHN M. FIELDS.

Witnesses:
JOHN H. HERRING,
W. W. HEALEY.

Copies of this patent may be obtained for five cents each, by addressing the "Commissioner of Patents, Washington, D. C."